United States Patent
Lee

(10) Patent No.: US 9,156,695 B2
(45) Date of Patent: Oct. 13, 2015

(54) METHOD FOR FABRICATING CARBON ALLOTROPES

(75) Inventor: Chae Deok Lee, Acton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 617 days.

(21) Appl. No.: 13/563,103

(22) Filed: Jul. 31, 2012

(65) Prior Publication Data

US 2014/0037532 A1 Feb. 6, 2014

(51) Int. Cl.
*C01B 31/02* (2006.01)
*C01B 31/06* (2006.01)

(52) U.S. Cl.
CPC ............... *C01B 31/02* (2013.01); *C01B 31/06* (2013.01)

(58) Field of Classification Search
None
See application file for complete search history.

(56) References Cited

U.S. PATENT DOCUMENTS

| 4,035,472 | A | 7/1977 | Tominaga | |
|---|---|---|---|---|
| 4,874,596 | A | 10/1989 | Lemelson | |
| 5,271,890 | A | 12/1993 | Shimura et al. | |
| 7,172,745 | B1 * | 2/2007 | Sung | 423/446 |
| 7,754,179 | B2 | 7/2010 | Lueking et al. | |
| 2010/0254884 | A1 * | 10/2010 | Shenderova | 423/446 |

OTHER PUBLICATIONS

D. Amans, et al., "Nanodiamond Synthesis by Pulsed Laser Ablation in Liquids," Elsevier—Diamond & Related Materials 18 (2009); pp. 177-180.
A. Hirsch, "The Era of Carbon Allotropes," Nature Materials, vol. 9, Nov. 2010; pp. 868-871.
A. Khachatryan, et al., "Graphite-to-Diamond Transformation Induced by Ultrasound Cavitation," Elseveir—Diamond & Related Materials 17 (2008); pp. 931-936.
Khaliullin, et al., "Nucleation Mechanism for the Direct Graphite-to-Diamond Phase Transition," [cond.mat.mtrl-sci] Jan. 7, 2011; pp. 1-5.
Physorg.com, "New Carbon Allotrope Could have a Variety of Applications," Copyright 2010 PhysOrg.com; pp. 1-2.
H. Niu, et al., "Electronic, Optical, and Mechanical Properties of Superhard Cold-Compressed Phases of Carbon," Applied Physics Letters 99, 031901; Jul. 18, 2011; pp. 031901-1-031901-3.
Physorg.Com, "Superhard Carbon Material Could Crack Diamond," Copyright 2011 PhysOrg.com; pp. 1-3.

* cited by examiner

*Primary Examiner* — Guinever S Gregorio
(74) *Attorney, Agent, or Firm* — Cantor Colburn LLP

(57) ABSTRACT

A method of fabricating a carbon allotrope is disclosed. The method includes forming an intermediate carbon template from a carbon feedstock; and creating a pressure and temperature in the carbon template suitable for fabrication of the carbon allotrope from the intermediate carbon template. The pressure and temperature may be created from a shockwave resulting from collapse of a bubble formed during a bubble cavitation process.

20 Claims, 6 Drawing Sheets

METHOD FOR FABRICATING CARBON ALLOTROPES

BACKGROUND

The present disclosure relates generally to carbon allotrope fabrication and, more particularly, to a method for forming high strength carbon allotropes from common carbon materials.

New carbon allotrope families have been discovered. These new carbon families may include amorphous-carbon, M-carbon, C8-carbon, W-carbon, T-carbon, and Z-carbon, for example. These new allotropes have hardness comparable to the hardness of diamond as well as distinguishing energy bandgap energies. Current methods of forming these carbon allotropes from graphite or fullerene or carbon nanotubes require high pressures and high temperatures.

SUMMARY

According to one embodiment, a method of fabricating a carbon allotrope includes: forming an intermediate carbon template from a carbon feedstock; and creating a pressure and temperature in the carbon template suitable for fabrication of the carbon allotrope from the intermediate carbon template.

According to another embodiment, a method of fabricating a carbon allotrope includes: forming an intermediate carbon template from a carbon feedstock; submerging the intermediate carbon template in an aqueous solution; and creating a shock wave in the aqueous solution to create a pressure and temperature in the aqueous solution suitable for fabricating the carbon allotrope from the intermediate carbon template.

According to another embodiment, a method of carbon allotrope fabrication includes a first stage in which an intermediate carbon template is formed by applying pressure to a carbon feedstock; and a second stage in which the intermediate carbon template is submerged in an aqueous solution and a shock wave is created in the aqueous solution to create a pressure and temperature suitable for fabrication of the carbon allotrope from the intermediate carbon allotrope.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method is presented herein by way of exemplification and not limitation with reference to the Figures.

Figure 1:
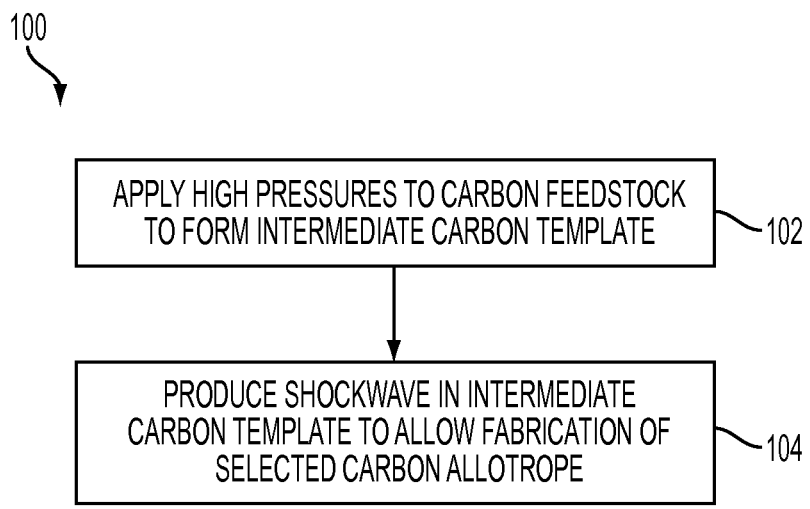
FIG. 1 shows a flowchart illustrating an exemplary method of fabricating a carbon allotrope disclosed herein.

FIG. 1 shows a flowchart illustrating an exemplary method of fabricating an exemplary carbon allotrope disclosed herein. The exemplary method includes a two-stage process for fabricating the carbon allotrope from carbon feedstock. In a first stage (box 102), carbon feedstock is compressed at high pressures to produce an intermediate carbon template phase. Such carbon feedstock may be a carbon phase that is abundant and/or easy to produce and may be in bulk or powder form. Exemplary carbon feedstock may include graphite such as highly-ordered pyrolitic graphite (HOPG), carbon nanotubes (CNT) and/or carbon fullerenes ($C_{60}$). The exemplary carbon feedstock is compressed at a pressure at which the carbon feedstock undergoes polymerization or buckling to form an intermediate carbon template that may then be used in a second stage to create the exemplary carbon allotropes. In the second stage, (box 104) shockwaves are produced in the intermediate carbon template to cause the intermediate carbon template to transition into a selected carbon allotrope. The shockwaves produce elevated pressures and temperatures at localized volumes in the intermediate carbon template, wherein the elevated pressure and temperature are suitable for transition from the intermediate carbon template to the exemplary carbon allotropes. In an exemplary embodiment, the shockwave is a result of bubble cavitation that may be produced using a laser source or acoustic source, as discussed below.

Figure 2:
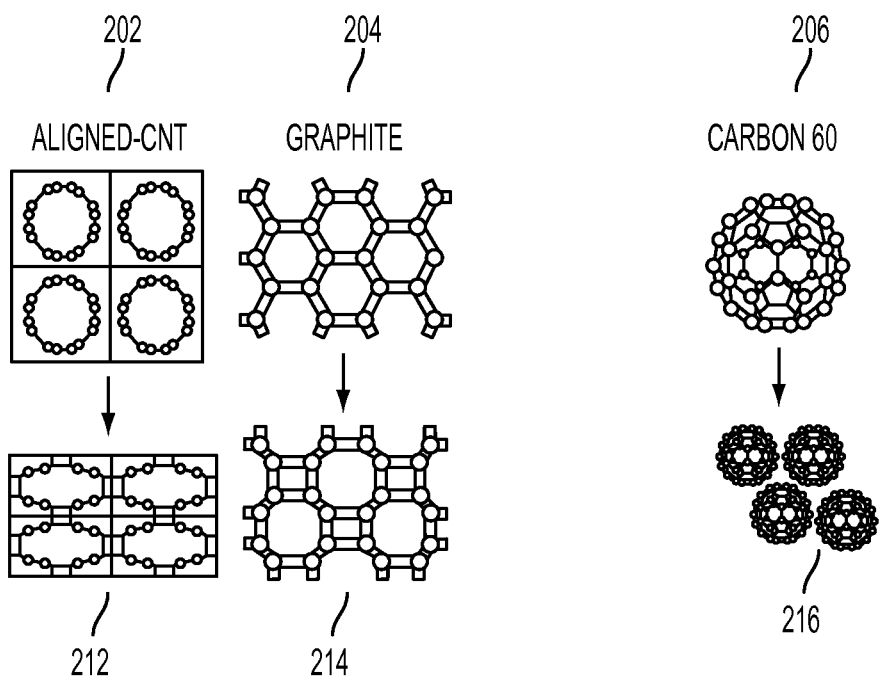
FIG. 2 illustrates exemplary carbon feedstock used in the first stage of the exemplary method of allotrope fabrication disclosed herein.
Figure 3:
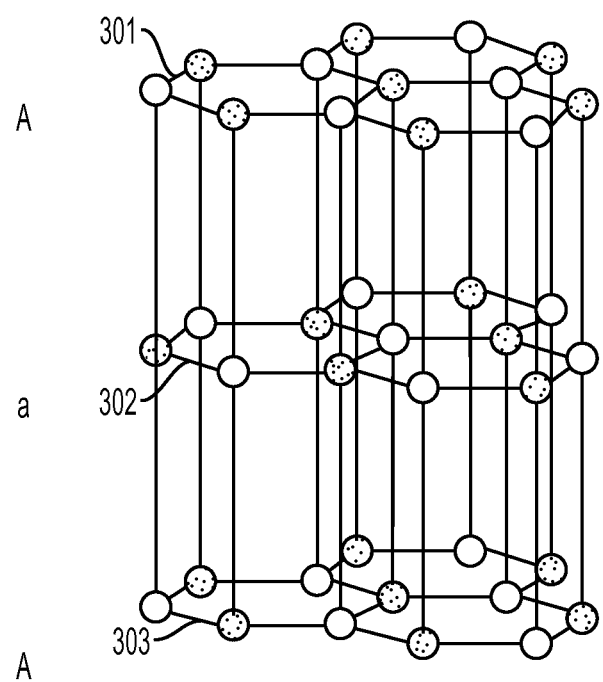
FIG. 3 shows an exemplary A-A stacking configuration of an intermediate carbon template.

FIG. 2 illustrates various exemplary carbon feedstock used in the first stage of the exemplary method of allotrope formation. Carbon feedstock may include carbon nanotubes 202, graphite 204 and carbon fullerenes 206 having a chemical structure of $C_{60}$, for example. Carbon nanotubes may be considered as seamless, rolled-up sheets of graphite. When high pressure is applied to the carbon feedstock, they undergo a transition to an intermediate carbon template. For example, when high pressure is applied to the carbon nanotube 202, it polymerizes to form its polymerized structure 212. When high pressure is applied to the carbon feedstock graphite 204, it undergoes buckling to form a sheet of buckled graphite 214. When high pressure is applied to carbon fullerene 206, it undergoes polymerization to form a polymerized fullerene structure 216. The intermediate carbon templates 212, 214 and 216 maintain their polymerized or buckled structure when the applied high pressures are removed and the intermediate carbon template returns to ambient pressures and temperatures. In various embodiments, the resulting intermediate carbon templates form carbon planes stacked upon each other in an A-A stacking configuration. FIG. 3 shows an exemplary A-A stacking configuration of exemplary planes 301, 302 and 303 of an intermediate carbon template. The A-A stacking enables the carbon allotropes formed in the second stage to have a generally hexagonal cell formation.

In the first stage, the pressure may be applied using known pressing tools. Some exemplary pressing tools may include a multianvil cell (MAC) Pressing tool that may apply up to 25 gigapascals (GPa) at 2000K to a volume of about 1 cubic centimeter ($cm^3$), an Instron® cylinder pressing tool that may apply up to 5 GPa from between 500K to greater than 1000K to a volume of about 20 $cm^3$, and a hot isostatic pressing tool that may produce up to about 0.6 GPa at 2000K to a volume that may be greater than 1000 $cm^3$. The exemplary pressing tools described herein are not meant as a limitation of the disclosure. Other pressing tools may also be used with the disclosed method of carbon allotrope formation.

As shown in FIG. 2, carbon nanotube 202 polymerizes to structure 212 by applying a pressure in a pressure range from about 0.5 GPa to about 12 GPa and a temperature in a temperature range from about 600K to about 2000K. The applied high pressure is less than a pressure and temperature at which cubic diamond formation occurs, which is generally at pressures greater than 12 GPa and temperatures greater than 2000K.

Figure 4:
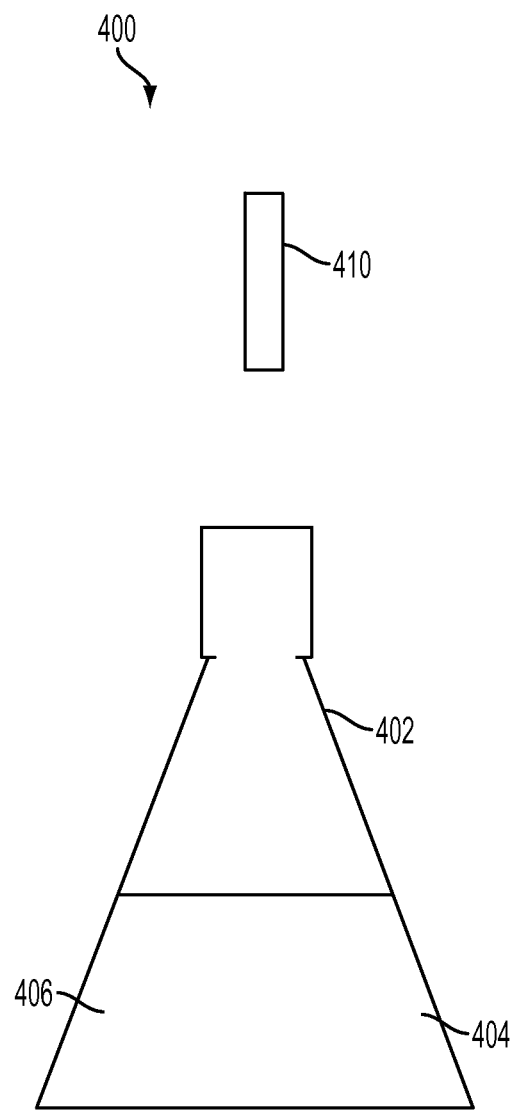
FIG. 4 shows an exemplary apparatus suitable for use in the second stage of carbon allotrope fabrication disclosed herein.

FIG. 4 shows an exemplary apparatus 400 suitable for use in the second stage (box 104) of carbon allotrope fabrication. The apparatus 400 includes a beaker 402 or other suitable containment equipment. The beaker is filled with an aqueous solution 404 such as pure water, ammonia water for nitrogen-doping, phosphorus water for phosphorus-doping, metal particles contained water for catalyst doping, and so on. The intermediate carbon template 406 is submerged in the aqueous solution 404 to form a mixture. The intermediate carbon template 406 and the aqueous solution 404 may be held at an ambient pressure and temperature. A bubble cavitation device 410 is held proximate the beaker in order to produce bubble cavitation in the aqueous solution 404. In various embodiments, bubble cavitation is used to create bubbles in the aqueous solution which subsequently collapse to produce pressure and temperature fluctuations that create, in a localized volume, the environmental conditions for the intermediate carbon template to undergo a transition to the exemplary carbon allotrope. In an exemplary embodiment, the bubble cavitation device 401 may include a laser source for providing a pulse laser beam to heat the aqueous solution to produce bubble cavitation. In another embodiment, the bubble cavitation device 401 may include a sonificator or other acoustic device configured to produce an acoustic pulse that causes bubble cavitation in the aqueous solution. The disclosure of a laser source and a sonificator is not meant as a limitation of the disclosure, and other bubble cavitation devices not disclosed herein may also be used with the exemplary apparatus.

The process of bubble cavitation is discussed below with respect to a sonificator. Bubble cavitation in the aqueous solution is followed by collapse of the bubble, which generates a high-energy shock wave, which promotes fragmentation of the carbon templates. If sufficiently powerful, bubble cavitation produces a combination of pressure and temperature that may enable a transition from the intermediate template phase to the carbon allotropes phase. Bubble cavitation concentrates low density elastic wave energy into higher densities as a result of the rapid collapse of cavitation bubbles produced in a suitable liquid medium. As an elastic (sound) wave passes through a liquid, it produces alternating regions of reduced density (negative pressure) and increased density (positive pressure). If the sound wave is sufficiently intense, the reduced density regions from cavities (bubbles) fill with a saturated vapor of the liquid. Any gases dissolved in the fluid diffuse through the cavity walls and also contribute to the vapor inside the bubble. In the contraction phase, the cavity collapses under the effect of positive pressure and surface tension forces and the vapor-gas mixture within the bubble experiences a rapid, strong adiabatic compression. Depending on the cavitation conditions, at the moment of collapse, the pressure and temperature inside the cavity may reach extremely high instantaneous values, such as p~10 GPa–100 GPa ($10^5$-$10^6$ bar) and T~1000K. As a result of the simultaneous collapse of many cavities, a cavitation zone may be formed in the ambient fluid. Thus, pressure and temperature may be produced locally in the carbon templates. The pressure and temperature may be controlled by altering various operating parameter of the bubble cavitation device 410, such as wavelength, pulse duration, laser fluence, and sonification power, for example. In addition, a correspondence may be determined between an operating parameter of the bubble cavitation device 410 and the particular allotrope that is produced at that operating parameter. Therefore, a particular allotrope may be selected for fabrication by selecting the operating parameter of the bubble cavitation device.

Figure 5:
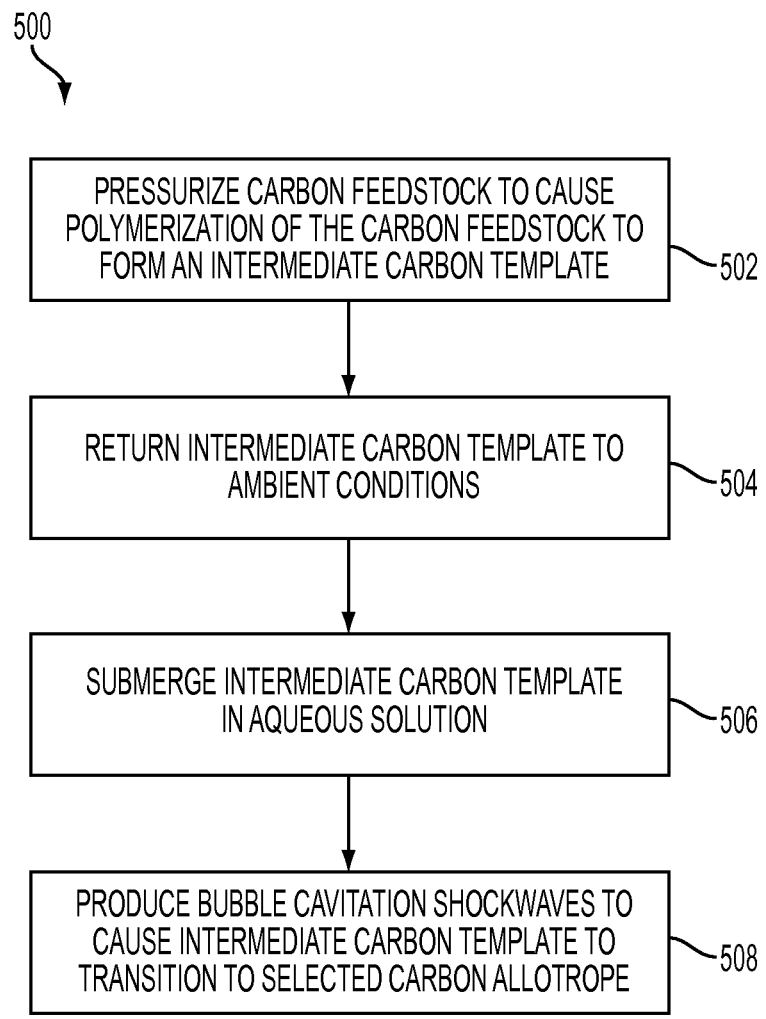
FIG. 5 shows a flowchart illustrating details of the exemplary method of carbon allotrope fabrication.

FIG. 5 shows a flowchart 500 illustrating details of the exemplary method of carbon allotrope fabrication disclosed herein. In box 502, a carbon feedstock is pressurized to promote at least one of polymerization and/or buckling of the carbon feedstock. In various embodiments, the carbon feedstock includes graphite such as high ordered pyrolytic graphite (HOPG), carbon nanotubes (CNT) and/or carbon fullerenes ($C_{60}$). The carbon feedstock is subjected to elevated pressure in a general range between about 0.5 GPa and about 5 GPa to produce polymerization and/or buckling to form an intermediate carbon template. In box 504, the intermediate carbon template is returned to ambient temperature and pressure. In box 506, the intermediate carbon template is submerged in an aqueous solution, such as, for example, ammoniated water. In box 506, a shockwave is produced in the aqueous solution by the collapse of bubbles that are produced in the aqueous solution via a controlled bubble cavitation process. The collapse of the bubbles creates local elevated pressures and temperatures within the carbon template in which carbon allotrope formation then occurs.

Figure 6:
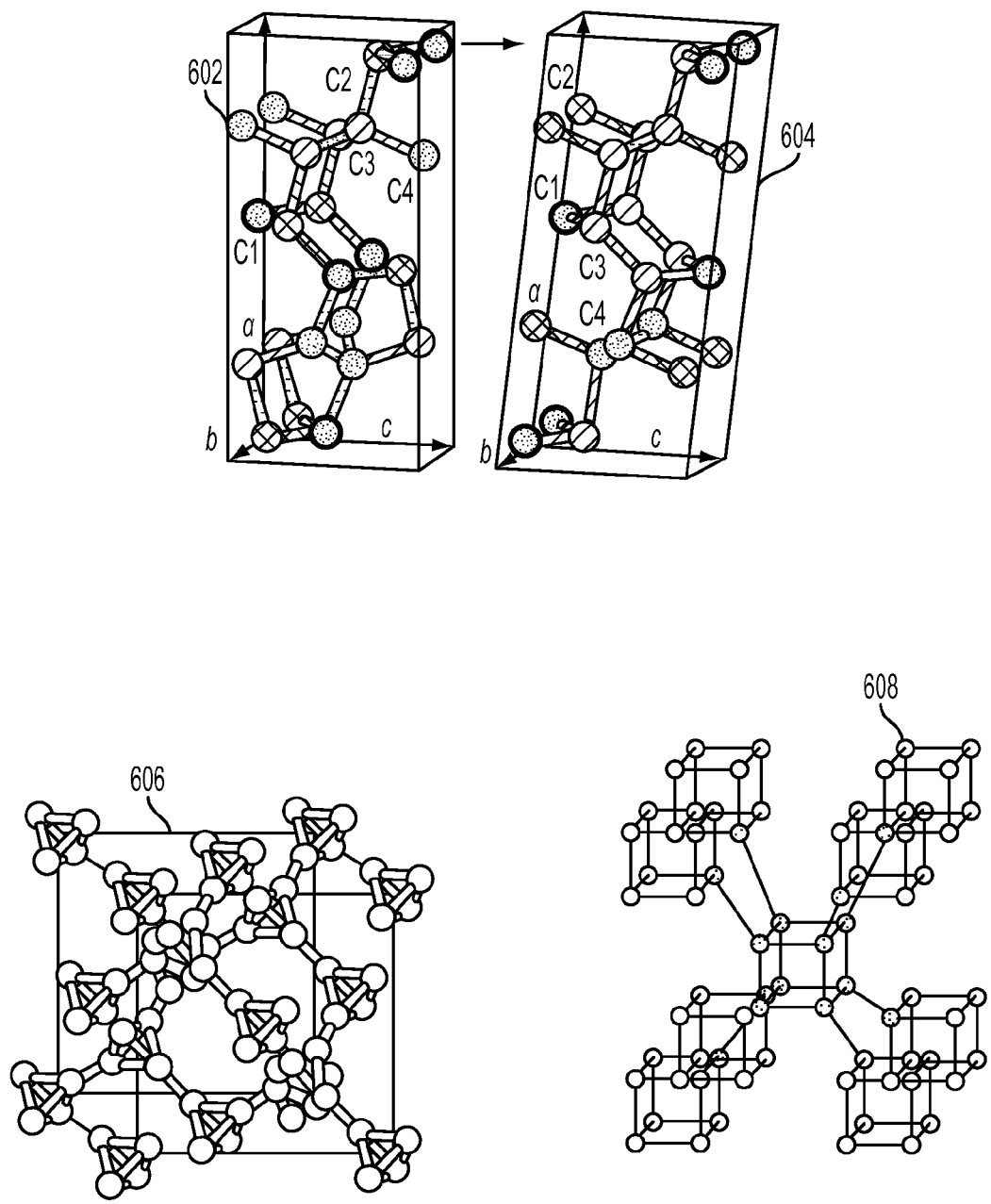
FIG. 6 shows various exemplary carbon allotropes that may be fabricated using the exemplary methods.

FIG. 6 shows various exemplary carbon allotropes that may be fabricated using the exemplary method disclosed herein. These carbon allotropes have generally have excellent hardness (>60% of diamond hardness) Various exemplary carbon allotropes may include, among others, amorphous carbon, M-carbon, W-carbon, T-carbon, Z-carbon, C4-carbon and C8-carbons. Amorphous carbon is an allotrope of carbon that does not having any crystalline structure. M-carbon 602 is a superhard monoclinic carbon phase. W-carbon 604 is a superhard orthorhombic carbon phase. T-carbon 606 is a carbon phase wherein each carbon atom of a diamond structure is substituted with a carbon tetrahedron. Each unit cell of the T-carbon structure thus contains two tetrahedrons with eight carbon atoms. Z-carbon 608 is an orthorhombic system with 8 atoms per primitive cell. C8-Carbon is a carbon allotrope that includes an atomic cluster of 8 carbon atoms, wherein the clusters are arranged in a shape of an elongated triangular bipyramid. C4-carbon is a body-centered tetragonal C4 phase.

The new carbon allotropes formed herein may have different bandgap energies than cubic diamond. For example, cubic diamond has an energy gap (Eg) of 5.45 electron-volts (eV). M-carbon has an $E_g$=3.56 eV, C4-carbon has an Eg=2.47 eV, and T-carbon has an Eg=2.25 eV. Mass densities of the exemplary carbon allotropes vary in a range from 50% less dense than cubic diamond to 10% more dense than cubic diamond.

Figure 7:
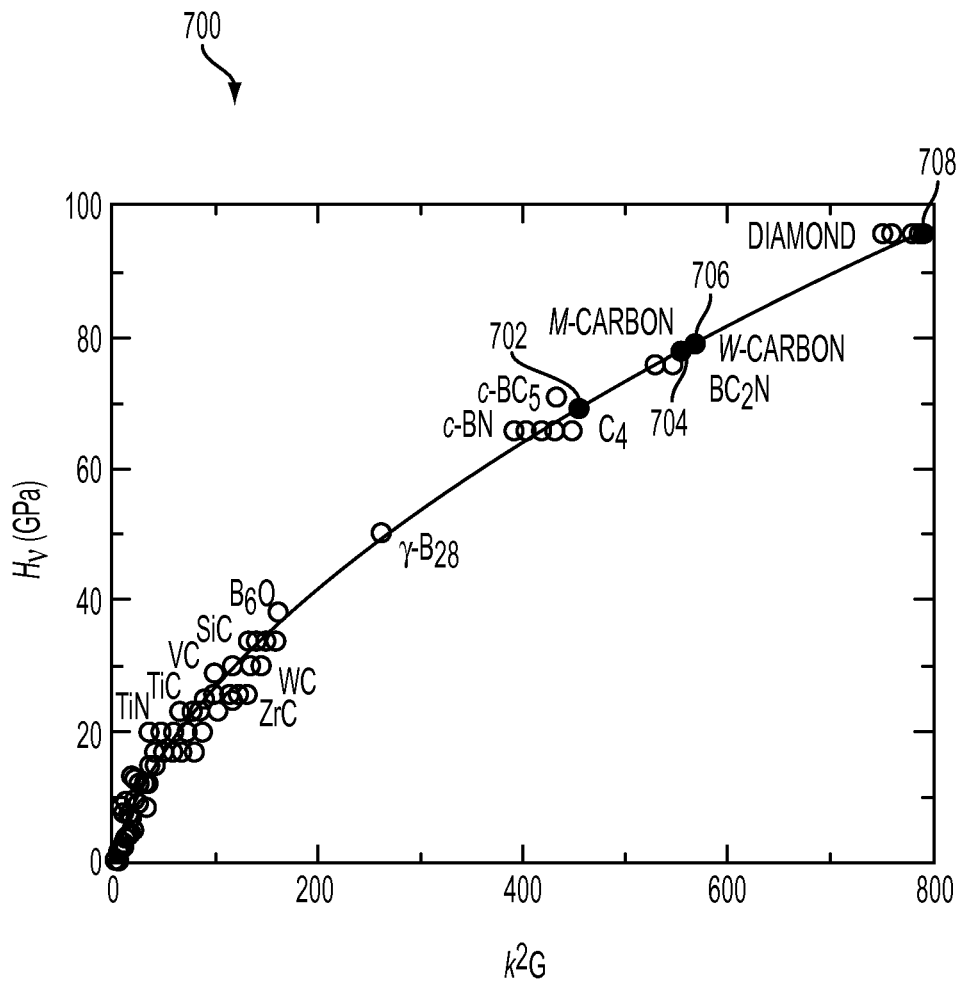
FIG. 7 shows a graph illustrating a hardness of various carbon allotropes formed using the methods disclosed herein.

FIG. 7 shows a graph 700 illustrating the hardness of various carbon allotropes formed using the methods disclosed herein. Vicker's hardness is plotted along the y-axis and Pugh's modulus ratio is plotted along the x-axis. Hardness is shown for the exemplary carbon allotropes, such as C4-carbon 702, M-carbon 704 and W-carbon 706. The hardness values of the carbon allotropes are in a range of the hardness of diamond 708 and in some instances, the carbon allotropes formed using the methods disclosed herein may be harder than diamond.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list or string of at least two terms is intended to mean any term or combination of terms. The term "secure" relates to one component being coupled either directly to another component or indirectly to the another component via one or more intermediate components.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of fabricating a carbon allotrope, comprising:
   forming an intermediate carbon template from a carbon feedstock;
   submerging the carbon template in an aqueous solution, and
   activating a bubble cavitation device to create a bubble in the aqueous solution, wherein collapse of the bubble creates a pressure and temperature in the carbon template suitable for fabrication of the carbon allotrope from the intermediate carbon template.

2. The method of claim 1, wherein forming the intermediate carbon template further comprises causing the carbon feedstock to undergo at least one of polymerization and buckling.

3. The method of claim 2, wherein forming the intermediate carbon template further comprises pressing the carbon feedstock to obtain a pressure within a range suitable for the at least one of polymerization and buckling.

4. The method of claim 1, wherein the intermediate carbon template includes planes of carbon atoms that are stacked in an A-A stacking.

5. The method of claim 1, wherein creating the pressure and temperature for carbon allotrope fabrication further comprises creating a shock wave in the intermediate carbon template.

6. The method of claim 5, wherein a collapse of a bubble created via bubble cavitation produces the shock wave in the aqueous solution.

7. The method of claim 1, wherein the bubble cavitation device further comprises at least one of a pulsed laser and an ultrasonic pulse.

8. The method of claim 1, wherein the carbon feedstock includes at least one of graphite, $C_{60}$ fullerenes, and carbon nanotubes.

9. The method of claim 1, wherein a structure of the fabricated carbon allotrope is at least one of: hexagonal diamond, amorphous-diamond, amorphous-carbon, M-carbon, C8-carbon, W-carbon, T-carbon and Z-carbon, C4-carbon.

10. A method of fabricating a carbon allotrope, comprising:
    forming an intermediate carbon template from a carbon feedstock;
    submerging the intermediate carbon template in an aqueous solution; and
    activating a bubble cavitation device to create a shock wave in the aqueous solution to create a pressure and temperature in the aqueous solution suitable for fabricating the carbon allotrope from the intermediate carbon template.

11. The method of claim 10, wherein forming the intermediate carbon template further comprises pressing the carbon feedstock to obtain a pressure in a range suitable for at least one of polymerization and buckling of the carbon feedstock.

12. The method of claim 10, further comprising creating the shock wave in the aqueous solution from a collapse of a bubble formed in the aqueous solution via the bubble cavitation device.

13. The method of claim 10, wherein the bubble cavitation device is at least one of a pulsed laser and an ultrasonic pulse.

14. The method of claim 10, wherein the carbon feedstock is at least one of graphite, $C_{60}$ fullerenes, and a carbon nanotubes.

15. The method of claim 10, wherein a structure of the fabricated carbon allotrope of at least one of hexagonal diamond, amorphous-diamond, amorphous-Carbon, M-carbon, C8-carbon, W-carbon, T-carbon and Z-carbon, C4-carbon.

16. A method of carbon allotrope fabrication, comprising:
    a first stage in which an intermediate carbon template is formed by applying pressure to a carbon feedstock; and
    a second stage in which the intermediate carbon template is submerged in an aqueous solution and a bubble cavitation device is activated to create a shock wave in the aqueous solution to create a pressure and temperature in the aqueous solution suitable for fabrication of the carbon allotrope from the intermediate carbon allotrope in the aqueous solution.

17. The method of claim 16, wherein the intermediate carbon template is formed in the first stage via at least one of polymerization and buckling of the carbon feedstock.

18. The method of claim 16, wherein the bubble cavitation device is activated to form a bubble in the aqueous solution of the second stage and collapse of the bubble forms a shockwave front in the aqueous solution.

19. The method of claim 16, wherein the bubble cavitation device is at least one of a pulsed laser and an ultrasonic pulse.

20. The method of claim 16, further comprising selecting an operating parameter of the bubble cavitation device to select a particular carbon allotrope that is fabricated.

* * * * *